United States Patent US 11,954,144 B2
Arbelle et al. Apr. 9, 2024

(54) TRAINING VISUAL LANGUAGE GROUNDING MODELS USING SEPARATION LOSS

(71) Applicant: International Business Machines Corporation, Armonk, NY (US)

(72) Inventors: Assaf Arbelle, Lehvot Haviva (IL); Leonid Karlinsky, Mazkeret Batya (IL); Sivan Doveh, Ramat Gan (IL); Joseph Shtok, Binyamina (IL); Amit Alfassy, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 17/412,528

(22) Filed: Aug. 26, 2021

(65) Prior Publication Data

US 2023/0061647 A1    Mar. 2, 2023

(51) Int. Cl.
| | |
|---|---|
| G06N 3/08 | (2023.01) |
| G06F 16/532 | (2019.01) |
| G06F 16/538 | (2019.01) |
| G06T 11/20 | (2006.01) |

(52) U.S. Cl.
CPC .......... *G06F 16/538* (2019.01); *G06F 16/532* (2019.01); *G06N 3/08* (2013.01); *G06T 11/20* (2013.01); *G06T 2210/12* (2013.01)

(58) Field of Classification Search
CPC ....... G06F 16/538; G06F 16/532; G06N 3/08; G06N 3/0464; G06N 3/0895; G06N 3/096; G06N 3/0455; G06T 11/20; G06T 2210/12; G06T 11/60

USPC .......................................................... 382/159
See application file for complete search history.

(56) References Cited

U.S. PATENT DOCUMENTS

| | | | |
|---|---|---|---|
| 10,565,305 B2 | 2/2020 | Lu et al. | |
| 10,824,916 B2 | 11/2020 | Sikka et al. | |
| 2020/0117951 A1 | 4/2020 | Li et al. | |
| 2021/0056742 A1 | 2/2021 | Sikka et al. | |

OTHER PUBLICATIONS

Mell et al., "The NIST Definition of Cloud Computing", National Institute of Standards and Technology, Sep. 2011, Special Publication 800-145, 7 pages.
Akbari et al., "Multi-level Multimodal Common Semantic Space for Image-Phrase Grounding", 2019 IEEE/CVF Conference on Computer Vision and Pattern Recognition (CVPR), DOI 10.1109/CVPR.2019.01276, 10 pages.
Datta et al., "Align2Ground: Weakly Supervised Phrase Grounding Guided by Image-Caption Alignment", 2019 IEEE/CVF International Conference on Computer Vision (ICCV), DOI: 10.1109/ICCV.2019.00269, 10 pages.

(Continued)

*Primary Examiner* — Stephen P Coleman
(74) *Attorney, Agent, or Firm* — Mark Bergner

(57) ABSTRACT

An example system includes a processor to receive, a randomly generated alpha-map, a pair of training images, and a pair of training texts associated with the pair of training images. The processor is to generate a blended image based on the randomly generated alpha-map and the pair of training images. The processor is to train a visual language grounding model to separate the blended image into a pair of heatmaps identifying portions of the blended image corresponding to each of the training images using a separation loss.

20 Claims, 9 Drawing Sheets

(56) References Cited

OTHER PUBLICATIONS

Mao et al., "Generation and Comprehension of Unambiguous Object Descriptions", 2016 IEEE Conference on Computer Vision and Pattern Recognition (CVPR), DOI 10.1109/CVPR.2016.9, 10 pages.

Plummer et al., "Flickr30k Entities: Collecting Region-to-Phrase Correspondences for Richer Image-to-Sentence Models", Proceedings of the IEEE International Conference on Computer Vision, 2015, 9 pages.

Xiao et al., "Weakly-supervised Visual Grounding of Phrases with Linguistic Structures", 2017 IEEE Conference on Computer Vision and Pattern Recognition, DOI 10.1109/CVPR.2017.558, 10 pages.

400

TRAINING VISUAL LANGUAGE GROUNDING MODELS USING SEPARATION LOSS

BACKGROUND

The present techniques relate to visual language grounding. More specifically, the techniques relate to training visual language grounding models that detect objects in images based on textual queries.

As multi-modal text and image data sources become abundant, so grows the importance of natural free-form text supervision over the more traditional image labels or image bounding boxes annotation methods. Such multi-modal data, such as image-text pairs, can be autonomously collected from web pages and documents with illustrations, user captioned personal photos, transcribed videos, among other sources. However, such form of automatic supervision poses significant challenges for learning. First, this automatic supervision is noisy in a sense that some of the text words may not be relevant to the image. Second, automatic supervision may not be well localized in a sense that it is unknown which parts of the image correspond to which parts of the text. In contrast, in traditional annotation, the training signal may be highly localized isolated and cropped object images are commonly used in classification, and bounding boxes or polygons around the objects are provided to train detection or segmentation models. However, these annotations are commonly manual and are costly to collect.

Therefore, weakly and autonomously supervised multi-modal (images+text) learning may be used instead in general, and Weakly Supervised Grounding (WSG) in particular. In WSG, the model is expected to learn to localize or highlight image regions corresponding to text phrases. In a sense, WSG is a detection task where the traditional 'noun object labels' are replaced by an unbounded set of things describable using natural language. Moreover, the WSG model is expected to learn from image and free-form corresponding text pairs without any annotations for correspondence of text words or phrases to image regions. For example, the corresponding free-form text may be in the form of captions.

While earlier WSG methods were detector-free, more recent WSG methods rely on the existence of pre-trained object detectors being the source of the localization regions of interest (RoIs) for grounding. Although this detector-based setup benefits from higher performance compared to Detector-Free WSG (DF-WSG) methods, in a sense it shifts away from the true WSG, as the detector is trained using bounding boxes, which are not used in WSG. The use of a detector is indeed plausible when the set of objects supported by the detector significantly overlaps the set of objects (nouns or their taxonomy siblings) appearing in the WSG texts. However, to train for WSG in a different domain or for a significantly different set of objects, such methods may involve collecting a large set of bounding boxes to train a new detector for the new domain. For example, such different domains may be news documents or technical documents. For example, in a recent detector-based WSG work, it was noted that using the 80-categories COCO-trained detector for the Flickr30K and Visual Genome (VG) WSG benchmarks performs poorly, as opposed to their best WSG result obtained with the VG trained detector that supports many more relevant categories.

SUMMARY

According to an embodiment described herein, a system can include processor to receive a randomly generated alpha-map, a pair of training images, and a pair of training texts associated with the pair of training images. The processor can also further generate a blended image based on the randomly generated alpha-map and the pair of training images. The processor can also train a visual language grounding model to separate the blended image into a pair of heatmaps identifying portions of the blended image corresponding to each of the training images using a separation loss. Thus, the system enables weakly supervised training without the use of a detector. Preferably, the training texts include natural free-form texts. In this embodiment, a wider range of training texts, such as captions, may be easily available for training. Preferably, the visual language grounding model includes an encoder to generate image encodings based on the alpha-map and the pair of training images, a text conditioner to generate a number of text attenuated image encodings based on the image encodings and the pair of training texts, and a decoder to convert the text attenuated image encodings into heatmaps. In this embodiment, the visual language grounding model can be trained using widely available training image and text pairs. Preferably, the text conditioner includes a Bidirectional Encoder Representations from Transformers (BERT) model. In this embodiment, the trained visual language grounding model may have improved accuracy. Optionally, the text conditioner includes a number of projection modules coupled to the BERT model. In this embodiment, the projection modules enable adaptation of the word embeddings from a BERT model to the space of visual features. Preferably, the visual language grounding model is trained using an unconditioned adversary loss. In this embodiment, the trained visual language grounding model may have decreased overfitting and thus improved performance on test data. Optionally, the system may include a separately trained detector-based weak supervised grounding network. The separately trained detector-based WSG network is to generate bounding boxes scores based on a received image and the trained visual language grounding model is to generate a first heatmap based on the received image. The bounding box scores are converted to a second heatmap using assignment of the bounding box scores to pixels of the bounding box. The first heatmap and the second heatmap are averaged to generate a combined heatmap. In this embodiment, a more accurate detection may be enabled by combining the outputs of the separately trained detector-based WSG network and the trained visual language grounding model.

According to another embodiment described herein, a method can include receiving, via a processor, training images, corresponding training texts, and a randomly generated alpha-map. The method can further include combining, via the processor, a pair of the training images using the randomly generated alpha-map to generate a blended image. The method can also further include training, via the processor, a visual language grounding model to separate the training images in the blended image as conditioned on the corresponding training texts. Thus, the method enables weakly supervised training without the use of a detector. Preferably, the method can also include receiving, via the processor, an image and a query phrase, inputting, via the processor, the image and the query phrase into the trained visual language grounding model, and receiving, via the processor, an output heatmap for the query phrase from the trained visual language grounding model. In this embodiment, the trained visual language grounding model enables improved accuracy of detection. Preferably, training the visual language grounding model includes calculating a separation loss for each of the pair of training images as a main training objective. In this embodiment, training data of images with captions without annotated locations of objects can be used to automatically train a weakly supervised visual language grounding model. Optionally, training the visual language grounding model includes calculating an image-to-text loss for text and image feature distribution alignment. In this embodiment, a stronger alignment may enable a more meaningful attenuation and therefore improved training results. Optionally, training the visual language grounding model includes calculating a negative texts loss based on a third received training text that is unrelated to the pair of training images. In this embodiment, the visual language grounding model may learn to reject conditioning texts that do not match any of the areas of the blended image and thus improves accuracy of the trained model. Optionally, training the visual language grounding model includes calculating an unconditioned adversary loss to decrease overfitting on artifacts. In this embodiment, the trained visual language grounding model may have decreased overfitting and thus improved performance on test data. Optionally, the method may include receiving an image and a query phrase, inputting the image and the query phrase into the trained visual language grounding model and separately trained detector-based model, receiving a first heatmap associated with the image for the query phrase from the trained visual language grounding model, receiving a bounding box with a bounding box score for the query from the separately trained detector-based model, converting the bounding box score into assigned values for pixels in the bounding box to generate a second heatmap for the image, and combining the first heatmap and the second heatmap to generate a combined heatmap for the query and the image. In this embodiment, the method can enable improved detection from the combination of the trained visual language grounding model and a separately trained detector-based model.

According to another embodiment described herein, a computer program product for training visual language grounding models can include computer-readable storage medium having program code embodied therewith. The computer readable storage medium is not a transitory signal per se. The program code executable by a processor to cause the processor to receive training images, corresponding training texts, and a randomly generated alpha-map. The program code can also cause the processor to combine a pair of the training images using the randomly generated alpha-map to generate a blended image. The program code can also cause the processor to train a visual language grounding model to separate the training images in the blended image as conditioned on the corresponding training texts. Thus, the program code enables weakly supervised training without the use of a detector. Preferably, the program code can also cause the processor to receive an image and a query phrase, input the image and the query phrase into the trained visual language grounding model, and receive an output heatmap for the query phrase from the trained visual language grounding model. In this embodiment, the program code enables improved object detection using the trained visual language grounding model. Preferably, the program code can also cause the processor to calculate a separation loss for each of the pair of training images as a main training objective. In this embodiment, training data of images with captions without annotated locations of objects can be used to automatically train a weakly supervised visual language grounding model. Optionally, the program code can also cause the processor to calculate an image-to-text loss for text and image feature distribution alignment. In this embodiment, a stronger alignment may enable a more meaningful attenuation and therefore improved training results. Optionally, the program code can also cause the processor to also further calculate a negative texts loss based on a third received training text that is unrelated to the pair of training images. In this embodiment, the visual language grounding model may learn to reject conditioning texts that do not match any of the areas of the blended image and thus improves accuracy of the trained model. Optionally, the program code can also cause the processor to also further calculate an unconditioned adversary loss to decrease overfitting on artifacts. In this embodiment, the decreased overfitting may improve accuracy of the trained visual language grounding model on data outside the training data.

DETAILED DESCRIPTION

According to embodiments of the present disclosure, a system includes a processor to receive a randomly generated alpha-map, a pair of training images, and a pair of training texts associated with the pair of training images. The processor can generate a blended image based on the randomly generated alpha-map and the pair of training images. The processor can train a visual language grounding model to separate the blended image into a pair of heatmaps identifying portions of the blended image corresponding to each of the training images using a separation loss. In various examples, the trained visual language grounding model may then be used to generate heatmaps for received images and queries. Thus, embodiments of the present disclosure enable weakly supervised phrase-grounding without the use of a pre-trained object detector. Moreover, because the techniques described herein learn everything from training images and associated free-form text pairs, the techniques may have an advantage over pre-trained object detectors in some categories that may be unsupported by pre-trained object detectors. In fact, accuracy improvements of 8.5% were noted for a range of benchmarks performed, as well as significant complementary improvements of above 7% over detected-based approaches. With an additional combination of unconditioned adversarial loss and negative text loss for training, an additional 9% improvement to overall accuracy was noted during experiments.

Figure 1A:
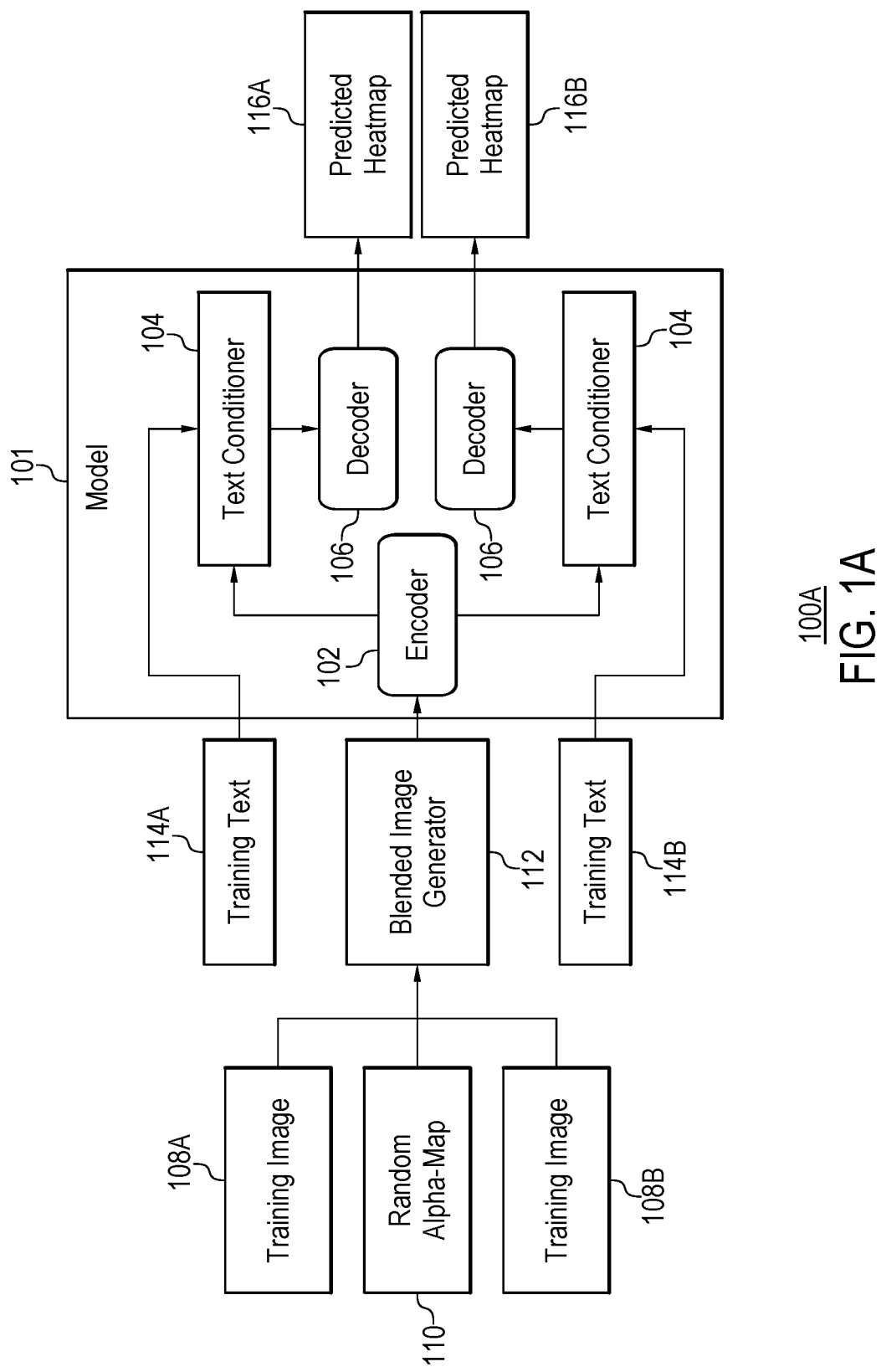
FIG. 1A is a block diagram of an example system for training a visual language grounding model using image separation.

With reference now to FIG. 1A, a block diagram shows an example system for training a visual language grounding model using image separation. The example system is generally referred to by the reference number 100A. FIG. 1A includes a model 101. For example, the model 101 may be a visual language grounding model. The model 101 includes an encoder 102. The model 101 further includes a text conditioner 104 communicatively coupled to the encoder 102. In various examples, although the text conditioner 104 is shown twice in FIG. 1A for clarity of processing, the text conditioner 104 may be one or more text conditioners. The model 101 further includes a decoder 106 communicatively coupled to the text conditioner 104. In various examples, the encoder 102, the text conditioner, and the decoder 106 may be different components or layers of a machine learning model 101. The system 100A includes a first training image 108A and a second training image 108B. The system 100A further includes a random alpha-map 110. For example, the random alpha-map 110 may have been randomly generated using any suitable technique. In various examples, the alpha-map may be randomly generated using the Perlin engine (released 1985), a normalized pixel-wise combination of two random Gaussians, a binary circular mask with randomly generated center and radius, or a random scale and random relative shift blending of one of the images of the blended pair into the other image of the pair, among other suitable techniques. In some examples, a mixture of blending alpha-map generation schemes may be used. For example, a mixture of alpha-maps generated using the Perlin engine and alpha-maps generated using the random Gaussians may be used. The generated random alpha-map may be the same size as the first training image 108A and the second training image 108B and may have a value of 0 or 1 for each of the pixels. The system 110A includes a blended image generator 112 shown receiving the first training image 108A, the second training image 108B, and the random alpha-map 110. For example, the blended image generator may be an image generator that can generate a blended image based on the first training image 108A, the second training image 108B, and the random alpha-map 110. The system 100A also includes a first training text 114A and a second training text 114B shown being received by the text conditioner 104 of the model 101. For example, the first training text 114A may be a caption corresponding to the first training image 108A and the second training test 114B may be a caption corresponding to the second training image 108B. The system 100A also further includes a first predicted heatmap 116A and a second predicted heatmap 116B shown being output by the decoder 106 of the model 101.

In the example of FIG. 1A, the model 101 is being trained using a pair of training images 108A and 108B each having a corresponding associated training texts 114A and 114B. As one example, the first training image 108A may be a pair of riders on motorcycles at a race course and the second training image 108B may be of a person snowboarding down a hill. Accordingly, the training text 114A associated with the first training image 108A may be the caption "two professional motorbike riders negotiating a tight right corner." The training text 114B associated with training image 108B may be the caption "a person in a colorful snowsuit, snowboards down a hill." In various examples, the associated pairs of training images and training texts may be received without any corresponding spatial annotation. In various examples, the blended image generated by the blended image generator 112 may have regions of pixels from the first training image 108A and the second training image 108B based on the values of the random alpha-map 110. For example, if corresponding portions of the first training image 108A and the second training mage 108B are blended using alpha value 0, pixels from the first training image may be returned as values for the blended image, and vice versa if the alpha value is 1. In the above example, the resulting blended image may thus be a synthetically merged image that includes portions of one or more of the motorcycle riders and portions of the snowboarder.

Still referring to FIG. 1A, the model 101 may generally be trained by forcing an auxiliary task of textually guided image separation. The model 101 may thus be trained to perform the inverse operation of the blended image generator 112. For example, the model 101 may be trained to predict the blending map 110 given the blended image and each one of the two captions 114A and 11B, belonging to original training images 108A and 108B, respectively. In various examples, for each caption 114A and 114B the model 101 highlights the image region originating in the corresponding source image 108A and 108B in a predicted heatmap 116A and 116B, respectively. In some examples, each of the predicted heatmaps 116A and 116B may be a spatial score-map with values that rate the relevance of each pixel of the given training text 114A and 114B, respectively, in the blended image generated by blended image generator 112. For example, image areas that correctly correspond to the training text are given a score of 1, while areas that do not correspond, and thus considered background, may be given a score of 0.

In the example of FIG. 1A, the system 100 receives training images 108A and 108B and training texts 114A and 114B. For example, the training images 108A and 108B may be two randomly selected images with associated texts 114A and 114B, respectively. The training images 108A and 108B and training texts 114A and 114B may be described as pairs $P_1=(I_1; T_1)$, with $I_1$ corresponding to training image 108A and $T_1$ corresponding to training text 114A and $P_2=(I_2, T_2)$, with $I_2$ corresponding to training image 108B and $T_2$ corresponding to training text 114B. In various examples, the two random image pairs $P_1$ and $P_2$ are randomly selected by the system 100A from a detector-free weakly supervised grounding (DF-WSG) task training data set.

The blended image generator 112 may thus receive the training images 108A and 108B and their associated training tests 114A and 114B, along with a random alpha-map 110. In various examples, assuming without the loss of generality that the training images 108A and 108B are of the same size ($|I_1|=|I_2|$), then the random alpha-map 110 $\alpha$ may be of size $|\alpha|=|I_1|$, where:

$$\alpha = \{0 \leq \alpha_{i,j} \leq 1 | 1 \leq i,j \leq |I_1|\} \qquad \text{Eq. 1}$$

In various examples, the blended image generator 112 may generate a blended image based on the training images 108A and 108B, and the random alpha-map 110. For example, the blended image $I_B$ may be a per-pixel convex combination of training images 108A and 108B that can be calculated using the equation:

$$I_B = \alpha \cdot I_1 + (1-\alpha) \cdot I_2 \qquad \text{Eq. 2}$$

In various examples, the model 101 may then be trained to for a DF-WSG task. In some examples, the model may be a Grounding by Separation (GbS) model described using the equation:

$$M(I,T) = H \qquad \text{Eq. 3}$$

For example, the model 101 may be trained to accept an image I and text T as corresponding inputs and return an output heatmap H for each text T, as described in system 200 of FIG. 2 below. This heatmap H may predict the probability of each pixel of the image I to be related to the text T in the sense that the pixel belongs to the part of the image I described by the text T. Thus, while the linkage between text parts of training text 114A and 114B and the corresponding image regions of training images 108A and 108B may not be known due to the weakly supervised grounding (WSG) setting, the association between the training text 114A and 114B components of the concatenated text $T_B=T_1+T_2$ and the pixels of the blended image $I_B$ in the generated 'synthetic' pair $(I_B, T_B)$ is given by construction and can be used as a synthetic training signal for training model 101 M. Thus, in various examples, a GbS main objective (loss function) can be calculated using the equation:

$$L_{sep}=MSE(M(I_B,T_1),\alpha)+MSE(M(I_B,T_2),1-\alpha) \qquad \text{Eq. 4}$$

where MSE is the mean-square-error that can be calculated using the equation:

$$MSE(x, y) = \frac{1}{|I_b|} \cdot \sum_{i,j}(x_{i,j} - y_{i,j})^2 \qquad \text{Eq. 5}$$

In this example, the model M learns to separate the blended image $I_B$ conditioned on the text.

As shown in FIG. 1A, the model 101 includes an encoder 102, a text conditioner 104, and a decoder 106. For example, the model 101 may be described as a GbS model M(I, T) returning the final output:

$$H=M(I,T)=D(C(E(I),T)) \qquad \text{Eq. 6}$$

where E(I)=E represents the encoder 102, C(E,T)=C represents the text conditioner 104, and D(C)=H represents the decoder 106. An example configuration of the encoder 102, text conditioner 104, and decoder 106 is described in more detail with respect to FIG. 1B below.

In various examples, additional auxiliary tasks may also be included in training of the model 101 to regularize the training procedure. For example, these additional tasks may be trained using a negative texts loss and an unconditioned adversary loss, described in greater detail with respect to FIG. 1B below.

It is to be understood that the block diagram of FIG. 1A is not intended to indicate that the system 100A is to include all of the components shown in FIG. 1A. Rather, the system 100A can include fewer or additional components not illustrated in FIG. 1A (e.g., additional training image pairs, training texts, random alpha-maps, blended images, encoders, decoders, text conditioners, or additional generated heatmaps, etc.).

Figure 1B:
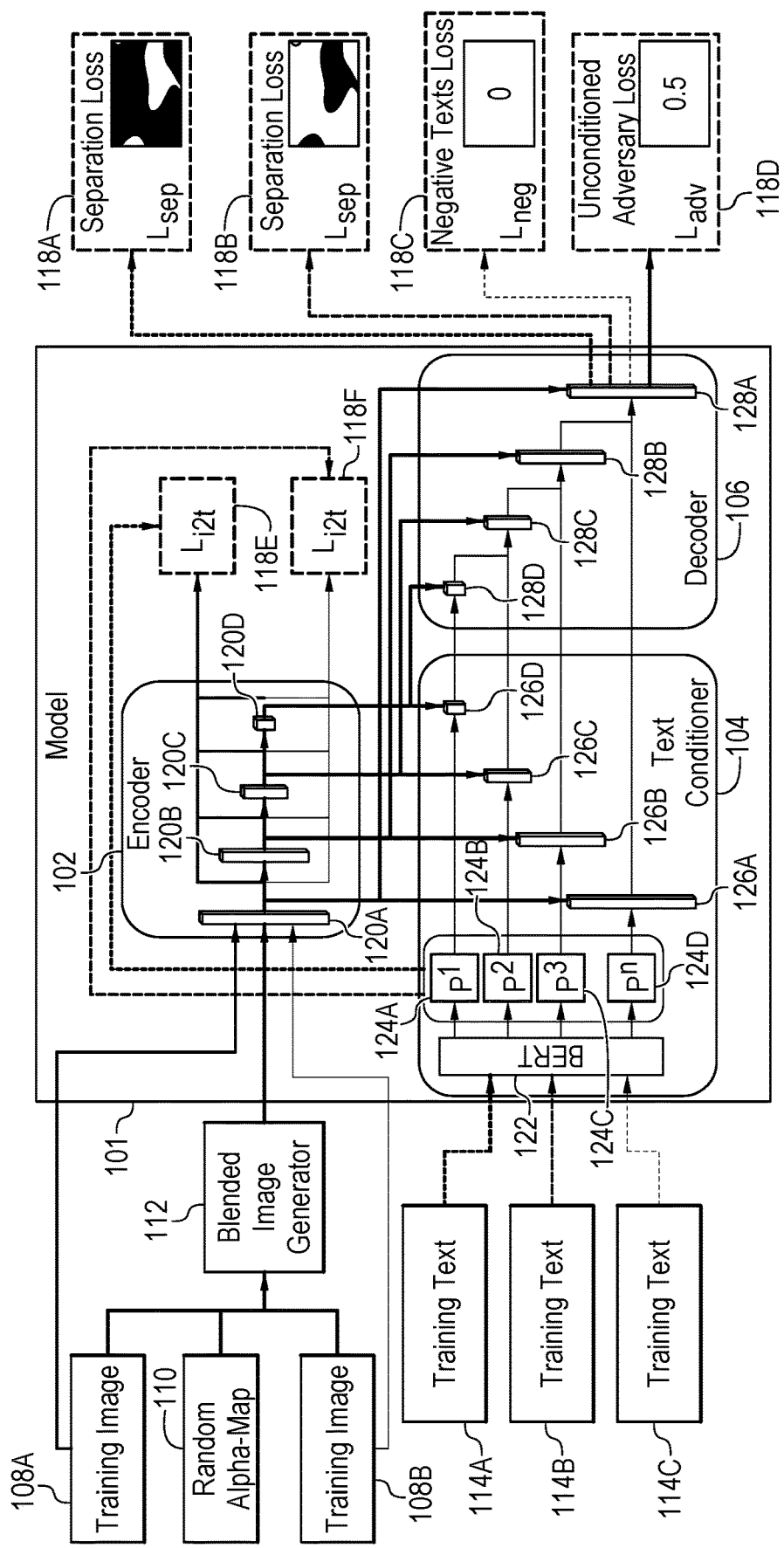
FIG. 1B is a more detailed block diagram of an example system for training a visual language grounding model using image separation.

With reference now to FIG. 1B, a more detailed block diagram shows an example system for training a visual language grounding model using image separation. The example system is generally referred to by the reference number 100B. FIG. 1B includes similarly numbered elements described in FIG. 1A. In addition, the system 100B includes a third training text 114C. For example, to continue the examples of FIG. 1A, the third training text 114C may be "a person throwing a ball to a dog." The system 100B also includes a first separation loss 118A, a second separation loss 118B, a negative texts loss 118C, an adversarial loss 118D, a first direct image-to-text alignment loss 118E, and a second direct image-to-text alignment loss 118F. For example, the first separation loss 118A may be a first element of the main objective loss that compares output of the decoder 106 to the portion of the random alpha-map 110 corresponding to training image 108A. The second separation loss 118A may be a second element of the main objective loss that compares output of the decoder 106 to the portion of the random alpha-map 110 corresponding to training image 108B. In some examples, the first separation loss 118A and the second separation loss 118A may be calculated using Eq. 4. Similarly, the first direct image-to-text alignment loss 118E may be applied to the training image 108A and the second first direct image-to-text alignment loss 118E may be applied to the training image 108B. In various examples, both the first direct image-to-text alignment loss 118E second first direct image-to-text alignment loss 118E may be calculated using Eq. 18. The encoder 102 includes layers 120A, 120B, 120C, and 120D. The text conditioner 104 includes a Bidirectional Encoder Representations from Transformers (BERT) model 122. For example, the BERT model 122 is a language representation model pre-trained using a masked language model pre-training objective. The text conditioner 104 further includes a set of projection modules 124A, 124B, 124C, and 124D communicatively coupled to the BERT model 122. For example, the projection modules 124A, 124B, 124C, and 124D may be a single fully connected layer of an artificial neural network. The text conditioner 104 further includes a set of layers 126A, 126B, 126C, and 126D communicatively coupled to the encoder 102. For example, the layers 126A, 126B, 126C, and 126D may receive output from the layers 120A, 120B, 120C, and 120D, respectively, of the encoder 102. The decoder 106 similarly includes ResNet blocks 128A, 128B, 128C, and 128D communicatively coupled to layers 126A, 126B, 126C, and 126D of the text conditioner 104. In some examples, the decoder 106 may be implemented using two layers. In various examples, the ResNet blocks 128A, 128B, 128C, and 128D may be implemented using 512 output planes, and one plane for the final output block, and a stride of 1. The layers 128A, 128B, 128C, and 128D of decoder 106 are further communicatively coupled such that the layer 128C received the output of layer 128D, the layer 128B receives the output of layer 128C, and the layer 128A receives the output of 128B.

In the example of FIG. 1B, the encoder 102 includes several convolutional neural network (CNN) blocks 120A, 120B, 120C, and 120D. In various examples, the encoder 102 includes pooling layers in between the blocks 120A, 120B, 120C, and 120D. For example, the pooling layers may each have a stride of r. As one example, the pooling layers may have a stride of r=2. In some examples, $E=[E^1, \ldots, E^n]$ may be set as a list of tensor outputs of n last blocks ordered in such a way that $E^1$ is the output of the last block 120D. In various examples, $|E^{i+1}|=r \cdot |E^i|$ due to the pooling stride r.

The text conditioner 104 include a text embedding model. The text conditioner 104 may be described using the equation:

$$N(T)=[W, \ldots, W_S] \qquad \text{Eq. 7}$$

where $W, \ldots, W_S$ is a set of word embeddings generated based on input text T. For example, the word embeddings may be in the form of real-valued vectors encoding the meaning of corresponding words or phrases. In various examples, as shown in FIG. 1B, the text embedding model may be a BERT model 122. For example, the BERT model 122 may be a pre-trained language model frozen during training so that its parameters are not changed. In various examples, for each of the input training texts 114A, 114B, 114C, the BERT model 122 can return a list of word embeddings in the particular context of each of the training texts 114A, 114B, 114C. The text conditioner 104 also includes projection modules 124A, 124B, 124C, 124D. For example, the projection modules 124A, 124B, 124C, 124D may be described using the equation:

$$P^i(W_j) = W_j^i \qquad \text{Eq. 8}$$

where i∈[1, ..., n] refers to a particular block of n total blocks within encoder 102. For example, n=4 in the example of FIG. 1B, with the encoder 102 including four blocks 120A-120D. In various examples, the projection modules 124A, 124B, 124C, 124D can adapt the word embeddings from the BERT model 122 to the space of visual features. In some examples, the adaptation may be followed by averaging over the words to obtain a full text T embedding per block. For example, the averaging may be performed as shown in the equation:

$$W^i = \frac{1}{s}\sum_j W_j^i \qquad \text{Eq. 9}$$

where s is the total number of words. In various examples, a text attenuation module may then generate text attenuated images to be sent to the decoder 106. For example, the text attenuation module may be implemented using a distance between the features computed from the words/text (W) to the features computed from the image (E) based on the equation:

$$A(E^i, W^i) = \exp\left(-\left|\frac{E^i}{\|E^i\|_2} - \frac{W^i}{\|W^i\|_2}\right|\right) \cdot E^i = C^i \qquad \text{Eq. 10}$$

where all operations are element-wise, $E^i$ is the space of visual features, $W^i$ is broadcasted to all the spatial locations of the tensor $E^i$, and the attenuation enhances locations of $E^i$ that are closer to the projected text embedding for that block. Alternatively, in some examples, the text attenuation module may use a projection attenuation. For example, a projection attenuation may be implemented using the equation:

$$A(E^i, W^i) = \cos_+(E^i, W^i) \cdot E^i \qquad \text{Eq. 11}$$

where $\cos_+$ denotes the positive part of the cosine similarity. In some examples, the text attenuation module may use an attention attenuation. For example, the attention attenuation may include the use of a self-attention block that accepts the concatenated $E^i$ and $W^i$ (replicated to each pixel of $E^i$) and outputs a tensor of the same size as $E^i$. In some examples, the text attenuation module may use scalar attentions that return a single channel or tensors outputs. For example, the text attenuation module can use a dist2Atten scalar type attenuation based on the equation:

$$A(E^i, W^i) = \exp(-\cos(E^i, W^i)) \qquad \text{Eq. 12}$$

In some examples, the text attenuation module can use a cosine scalar type attenuation based on the equation:

$$A(E^i, W^i) = \cos_+(E^i, W^i) \qquad \text{Eq. 13}$$

The output of the text conditioner 104 may thus be the per-block list of text attenuated image encodings: C=[C1, ..., Cn].

The decoder 106 can convert the text attenuated image encoding into a final predicted heatmap. For example, the decoder 106 can be described using the equation D(C)=H. In various examples, the decoder 106 includes a series of blocks [$D_1$, ..., $D_n$]. For example, FIG. 1B includes four blocks 128A, 128B, 128C, and 128D. In some examples, the blocks may be ResNet blocks. For example, each of the blocks [$D_1$, ..., $D_n$] may be configured such that they receive the text attenuated image encodings [$C_1$, ..., $C_n$], respectively. Thus, block 128A may receive the output text attenuated image encoding from block 126A, etc. For example, the output of the decoder may be described using the equation $O_1 = D_1(C_1)$. In various examples, similarly to a U-Net, each subsequent block of the decoder 106 may receive a combination of an upscaled previous output and the input, as shown in the equation:

$$O_i = D_i(cat(C_i, U_r(O_{i-1}))) \qquad \text{Eq. 14}$$

where cat is a channel-wise concatenation and $U_r$ is the spatial upscaling factor of r. In some examples, the number of channels in $O_i$ may be set as the same in $C_i$ except for $O_n$=H, in which the final output of the decoder has a single channel.

In various examples, additional auxiliary tasks may also be included in training of the model 101 to regularize the training procedure. For example, given a random caption 114C, which is not related to either of the images 108A and 108B, the model 101 may be trained to return a zero-map. The model 101 may be trained to not only to produce correct predictions matching the conditioning on the corresponding texts 114A and 114B, but also to learn to 'reject' conditioning training text 114C that does not match. In other words, given a random unrelated text 114C, the model 101 may be trained to produce close to zero prediction on the blended image $I_b$ indicating that no pixel represents this text. For example, the negative loss may be defined to optimize for this requirement using the equation:

$$L_{neg} = MSE(D(C(E(I_b), T_{neg})), 0 \cdot 1_{|H|}) \qquad \text{Eq. 15}$$

where $0 \cdot 1_{|H|}$ is a uniform heatmap with 0 in all pixels indicating that no pixel represents either of the texts.

In various examples, the unconditioned adversary loss 118D may be used to reduce overfit to the training data. For example, images blended with a random alpha-map 110 may differ from natural images and contain blending artifacts that could in turn be leveraged by the model 101 in order to produce the source separation. This leveraging of blending artifacts may increase overfit to training data and thus decrease test performance. To reduce this effect, the system 100B includes the unconditioned adversary loss 118D reducing the use of parameters that build upon these artifacts. For example, the unconditioned adversary loss 118D may be calculated using the equation:

$$L_{adv} = MSE(D(E(I_b)), 0.5 \cdot 1_{|H|}) \qquad \text{Eq. 16}$$

where $0.5 \cdot 1_{|H|}$ is a uniform heatmap with 0.5 in all pixels indicating maximally uncertain prediction in case no text conditioning was provided. Thus, if no query is given, then the model 101 may be trained to return a uniformly "0.5" valued heatmap.

In various examples, a direct image-to-text alignment loss $L_{i2t}$ 118F may be added between non-blended batch images and their corresponding batch texts. For example, the system 100B can calculate a similarity between each pair of image m and text corresponding to another or the same image k in the batch using the equation:

$$Z_{k,m} = \max_i [\cos(\Sigma_{xy}[\cos+(W_k^i, E_m^{i,xy}) \cdot E_m^{i,xy}], W_k^i)] \qquad \text{Eq. 17}$$

where cos denotes the cosine similarity and the cos+ denotes its positive part, and $E_m^{i,xy}$ indicates the feature vector at spatial location (x, y) in the $E_m^i$ tensor. In various examples, the direct image-to-text alignment loss $L_{i2t}$ 118E and direct image-to-text alignment loss $L_{i2t}$ 118F may then be calculated using the equation:

$$L_{i2t} = \Sigma_k CE[\text{softmax}(t_{i2t} \cdot Z_{k,\cdot}), k] + \Sigma_m CE[\text{softmax}(t_{i2t} \cdot Z_{\cdot,m}), m] \quad \text{Eq. 18}$$

where $Z_{k,\cdot}$ and $Z_{\cdot,m}$ represent the text #k row and image #m column of the matrix Z, respectively, $t_{i2t}$ is the softmax temperature, and CE is the cross-entropy loss with respect to the index of the "correct answer." As one example, the softmax temperature may be implemented as $t_{i2t}=10$. For example, the "correct answer" may be the respective row or column index itself. In various examples, the text may best match its corresponding image in the batch when symmetrically looking at the set of all batch images or all batch texts. Finally, the direct matching of the text to the image also produces a heatmap predicting pixel correspondence to the query text. Therefore, in addition to H returned by the decoder D, an additional output $H_{i2t}$ may be defined from the model 101, which is an attention map produced by a direct matching. For example, the additional output may be defined by the equation:

$$H_{i2t}(x,y) = \max_i [U_{|E^n|}(\cos_+(W_k^i, E_m^{i,x,y}))] \quad \text{Eq. 19}$$

where $U_{|E^n|}$ scales up to the spatial size of $|E^n|$. In various example, the output of the model 101 may thus be trained to be the per pixel geometric mean of $H_{GbS}$ and $H_{i2t}$. In this manner, a stronger alignment between the text embedding $\{W^i\}$ and the visual features $\{E^1\}$ returned by different depth blocks of the encoder 102 may result in more meaningful attenuation and in turn improved results.

Still referring to FIG. 1B, an overall loss $L_{GbS}$ may be calculated as the sum of the losses described above. For example, the overall loss $L_{GbS}$ may be calculated using the equation:

$$L_{GbS} = L_{sep} + \gamma_{adv} \cdot L_{adv} + \gamma_{neg} \cdot L_{neg} + \gamma_{i2t} \cdot L_{i2t} \quad \text{Eq. 20}$$

where $\gamma_{adv}$, $\gamma_{neg}$, and $\gamma_{i2t}$ are weights for losses $L_{adv}$, $L_{neg}$, and $L_{i2t}$, respectively. As one example, the weights may be implemented as $\gamma_{adv}=1$, $\gamma_{neg}=1$, and $\gamma_{i2t}=0.1$.

It is to be understood that the block diagram of FIG. 1B is not intended to indicate that the system 100B is to include all of the components shown in FIG. 1B. Rather, the system 100B can include fewer or additional components not illustrated in FIG. 1B (e.g., additional training image pairs, training texts, random alpha-maps, blended images, encoders, decoders, text conditioners, generated heatmaps, layers, or additional losses, etc.). In various examples, the BERT model 122 may be replaced with any other suitable language model. For example, the BERT model 122 can be replaced with an ELMO model that is pre-trained to extract context-sensitive features from a left-to-right and a right-to-left language model. In some examples, an ADAM optimizer, version 9 released in 2017, may also be used for training. In various examples, a linear regression (LR) schedule starting from LR=0.0001 and divided by 10 every 50,000 steps may be used. In some examples, a 50% dropout augmentation may be used for the text. In various examples, a random crop and a 512×512 resize may be used. In some examples, a color jitter, a horizontal flip, and grayscale augmentation, or any combination thereof, may also be used for the training images 108A and 108B.

Figure 2:
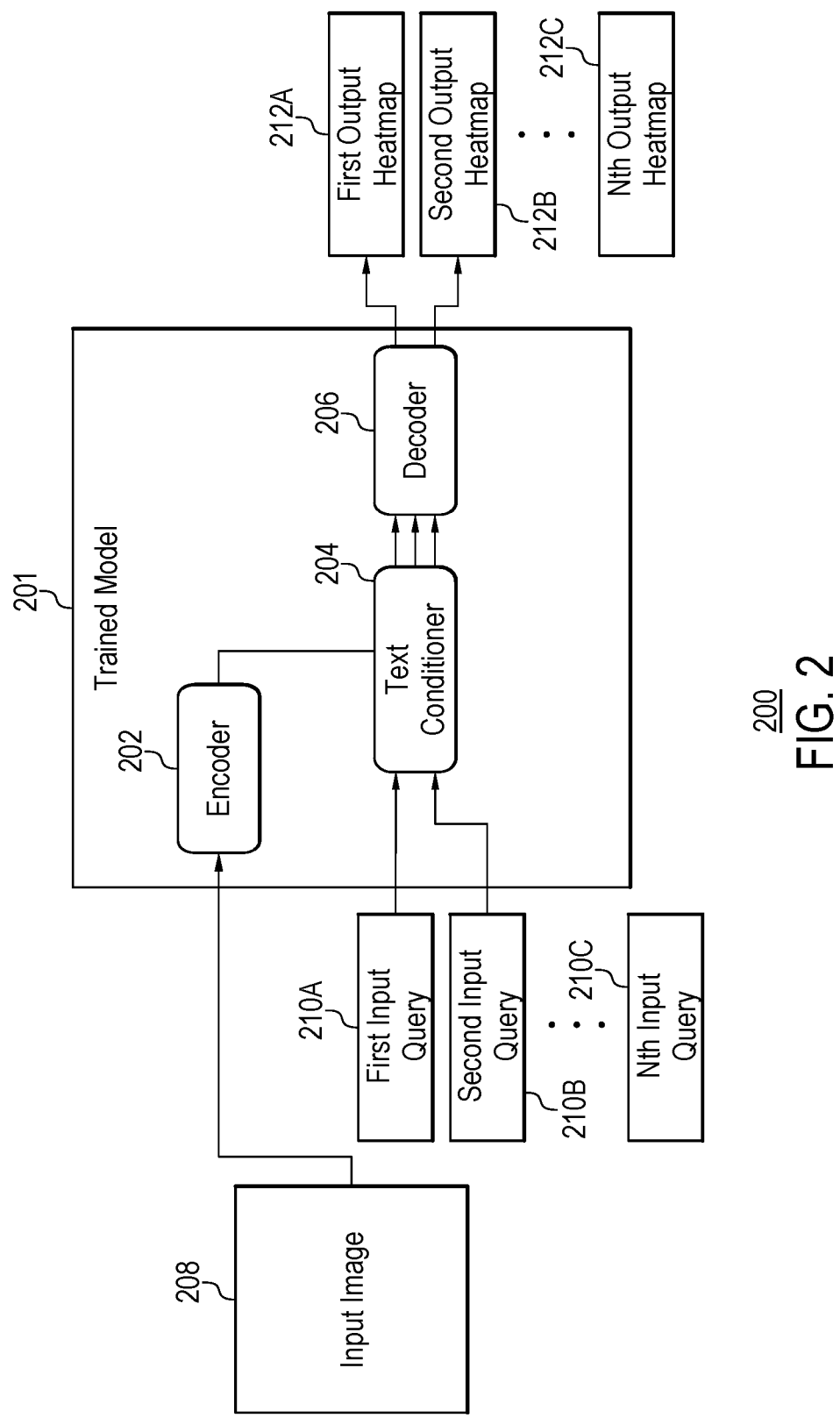
FIG. 2 is a block diagram of an example system for grounding text in images using a visual language grounding model trained using image separation.

With reference now to FIG. 2, a block diagram shows an example system for grounding text in images using a visual language grounding model trained using image separation. The example system is generally referred to by the reference number 200. FIG. 2 includes a trained model 201. For example, the trained model 201 may be the model trained in FIG. 1A or 1B. The trained model 201 includes an encoder 202, a text conditioner 204, and a decoder 206. The system 200 further includes an input image 208. For example, the input image 208 may be a non-blended query image that may contain one or more regions corresponding to. The system 200 also includes a number of input queries 210A, 210B, and 210C. For example, the input queries 210A, 210B, and 210C may be free-form text of words or phrases. As indicated by ellipses, additional queries can be included. The system also further includes a set of output heatmaps 212A, 212B, and 212C. As similarly shown by ellipses, and additional number of output heatmaps can be generated. For example, the number of heatmaps 212A-212C may be equal to the number of input queries 210A-210C.

In the example of FIG. 2, after the training phase, the trained model 201 may be applied to an image 208 with one or more textual queries 210A, 210B, and 210C. If a query 210A, 210B, or 210C is visible within the image, then the trained model 201 produces a heatmap 212A, 212B, or 212C highlighting the relevant areas of the input image 208. In various examples, as shown in FIG. 2, multiple queries 210A, 210B, and 210C can be applied to a given image 208.

Still referring to FIG. 2, in various examples, a received natural image can be considered as an alpha blending of regions with different semantic meanings. For example, an input image 208 may be considered as an overlay of different object segments. Thus, following training, the trained model 101 may be provided with a random test image $I_t$ 208 and some corresponding query text $T_q$ 210A, 210B, or 210C, computing $M(I_t, T_q)$, and produce a heatmap $H_q$ 212A, 212B, or 212C, such that heatmap $H_q$ 212A, 212B, or 212C is considered a result of an alpha-blending with an He alpha-map between an image $I_q$ corresponding entirely to $T_q$ 210A, 210B, or 210C, and the complement image $\hat{I}_q$ containing everything on input test image $I_t$ 208 that is unrelated to query text $T_q$ 210A, 210B, or 210C, as described in the equation:

$$I_t = H_q \cdot I_q + (1 - H_q) \cdot \hat{I}_q \quad \text{Eq. 21}$$

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional training image pairs, training texts, random alpha-maps, blended images, encoders, decoders, text conditioners, or additional losses, etc.). In various examples, the system 200 can also further include a separately trained detector. For example, the detector may have been trained using any suitable techniques. In some examples, the separately trained detector has been trained to learn a semantic space where the word embeddings can be matched to local image descriptors. For example, the separately trained detector may be a detector-based WSG network. In various examples, the converted output of the separately trained detector may be combined with the output heatmaps 212A-212C to generate an augmented set of heatmaps. For example, separately trained detector may generate bounding boxes with bounding box scores that may be converted into pixel values based on the bounding box score for each bounding box to generate a second heatmap for each image and query combination. These heatmaps may be combined with the output heatmaps 212A-212C to generate combined heatmaps that may have improved accuracy. For example, the values of the heatmaps may be combined using simple geometric averaging, or any other suitable technique.

Figure 3:
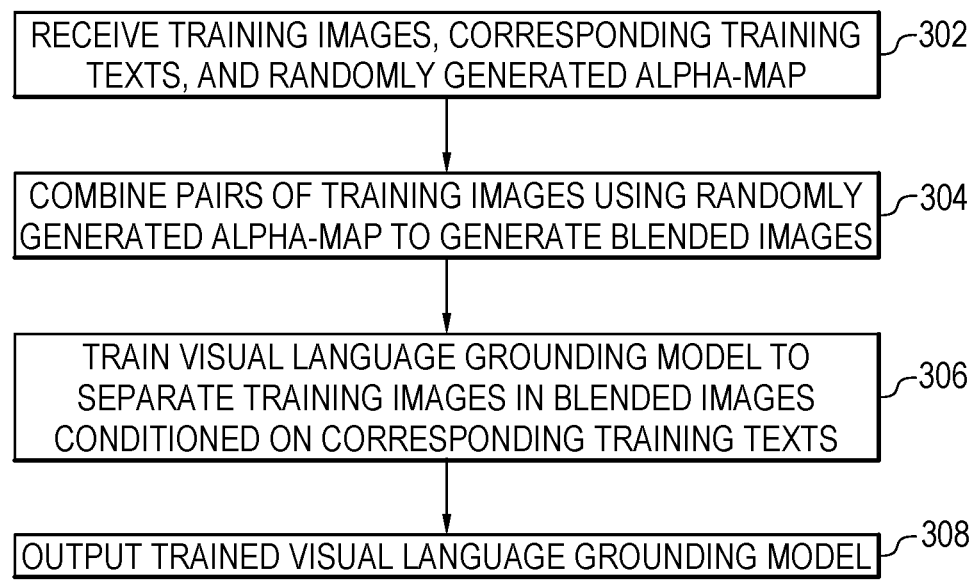
FIG. 3 is a block diagram of an example method that can train a visual language grounding model using image separation.

FIG. 3 is a process flow diagram of an example method that can train a visual language grounding model using image separation. The method 300 can be implemented with any suitable computing device, such as the computing device 500 of FIG. 5 and is described with reference to the systems 100A and 100B of FIGS. 1A and 1B. For example, the methods described below can be implemented by the processor 502 of the computing device 500 or the processor 802 of the computer readable media 800 of FIGS. 5 and 8.

At block 302, a processor receives training images, corresponding training texts, and a randomly generated alpha-map. For example, the training texts may be free-form texts. In various examples, the randomly generated alpha-map may be generated using the Perlin engine, a normalized pixel-wise combination of two random Gaussians, a binary circular mask with randomly generated center and radius, or a random scale and random relative shift blending of one of the images of the blended pair into the other image of the pair.

At block 304, the processor combines a pair of the training images using the randomly generated alpha-map to generated a blended image. For example, portions from each of the training images may be selected according to the alpha-map and combined to form the blended image.

At block 306, the processor trains a visual language grounding model to separate the training images in the blended image as conditioned on the corresponding training texts. For example, the processor calculates a separation loss for each of the pair of training images as a main training objective. In some examples, the processor calculates an image-to-text loss for text and image feature distribution alignment. In various examples, the processor calculates a negative texts loss based on a third received training text that is unrelated to the pair of training images. In some examples, the processor calculates an unconditioned adversary loss to decrease overfitting on artifacts.

At block 308, the processor outputs the trained visual language grounding model. For example, the trained visual language grounding model may be used to ground text in images as described in FIG. 4 below.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
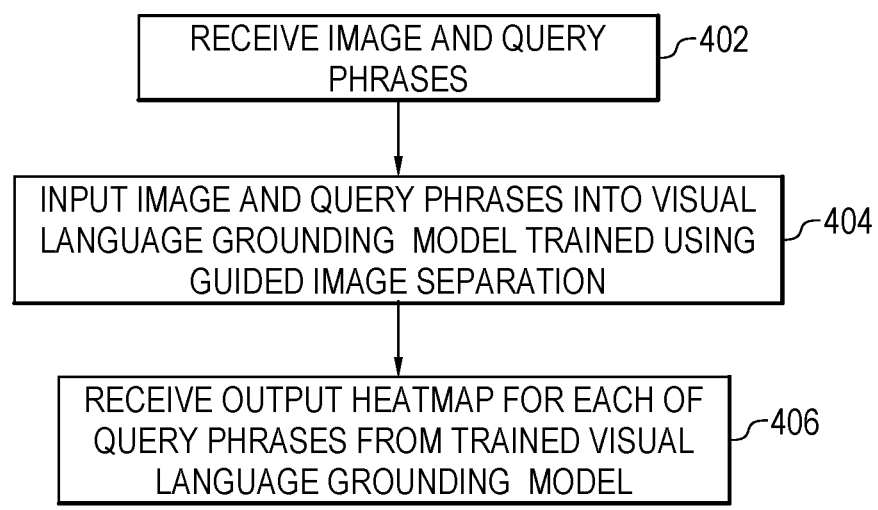
FIG. 4 is a block diagram of an example method that can ground text in images using a visual language grounding model trained using image separation.

FIG. 4 is a process flow diagram of an example method that can ground text in images using a visual language grounding model trained using image separation. The method 400 can be implemented with any suitable computing device, such as the computing device 500 of FIG. 5 and is described with reference to the system 200 of FIG. 2. For example, the methods described below can be implemented by the processor 502 of the computing device 500 or the processor 802 of the computer readable media 800 of FIGS. 5 and 8.

At block 402, a processor receives an image and query phrases. For example, the query phrases may describe objects to be detected in the image.

At block 404, the processor inputs the image and the query phrases into the trained visual language grounding model. For example, the trained visual language grounding model may have been trained using method 300 of FIG. 3.

At block 406, the processor receive an output heatmap for each of the query phrases from the trained visual language grounding model. For example, each heatmap may include pixels with values indicating the presence or absence of an object described by the query phrase.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
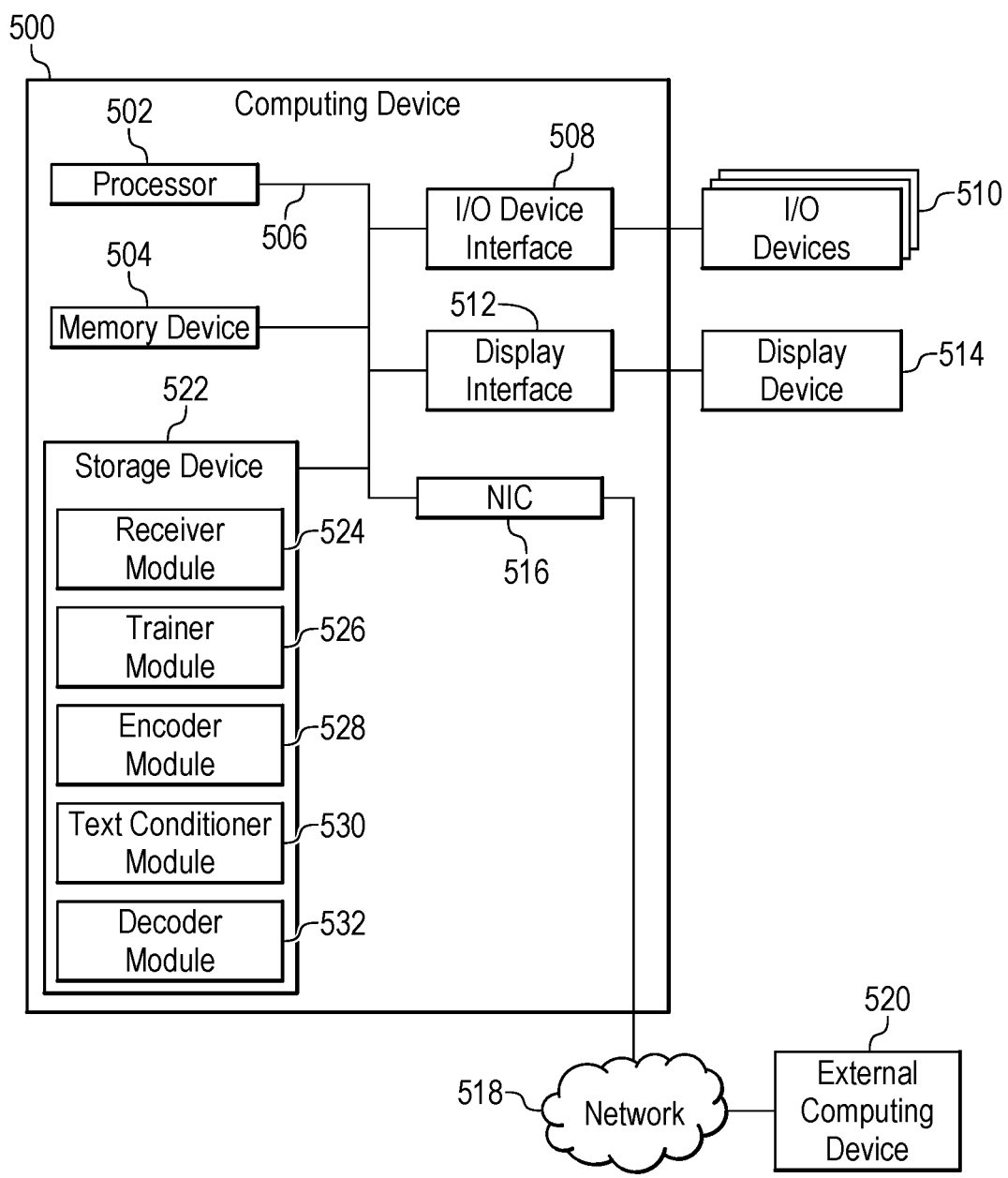
FIG. 5 is a block diagram of an example computing device that can ground text in images using a visual language grounding model trained using image separation.

FIG. 5 is block diagram of an example computing device that can ground text in images using a visual language grounding model trained using image separation. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external webserver 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, a trainer module 526, an encoder module 528, a text conditioner module 530, and a decoder module 532. The receiver module 524 can receive a randomly generated alpha-map, a pair of training images, and a pair of training texts associated with the pair of training images. For example, the training texts may be natural free-form texts. In some examples, the receiver module 524 can generate a blended image based on the randomly generated alpha-map and the pair of training images. The trainer module 526 can train a visual language grounding model to separate the blended image into a pair of heatmaps identifying portions of the blended image corresponding to each of the training images using a separation loss. The trainer module 526 can train the visual language grounding model using an unconditioned adversary loss, a negative text loss, an image-to-text loss, or any combination thereof. In various examples, the visual language grounding model includes an encoder module 528, a text conditioner module 530, and a decoder module 532. The encoder module 528 can generate image encodings based on the alpha-map and the pair of training images. The text conditioner module 530 can generate a number of text attenuated image encodings based on the image encodings and the pair of training texts. For example, the text conditioner module 530 may include a Bidirectional Encoder Representations from Transformers (BERT) model. The text conditioner module 530 may also include a number of projection modules coupled to the BERT model. The text conditioner module 530 may also further include a text attenuation module. The decoder module 532 can convert the text attenuated image encodings into heatmaps.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). In some examples, the storage device 522 may also include a separately trained detector-based weak supervised grounding network. For example, the separately trained detector-based WSG network can generate bounding boxes scores based on a received image and the trained visual language grounding model is to generate a first heatmap based on the received image. In various examples, the bounding box scores are converted to a second heatmap using assignment of the bounding box scores to pixels of the bounding box, and the first heatmap and the second heatmap can be averaged to generate a combined heatmap. Furthermore, any of the functionalities of the receiver module 524, the trainer module 526, the encoder module 528, the text conditioner module 530, and the decoder module 532, may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 524, the trainer module 526, the encoder module 528, the text conditioner module 530, and the decoder module 532 can be implemented with logic, wherein the logic, as referred to herein, can include any suitable hardware (e.g., a processor, among others), software (e.g., an application, among others), firmware, or any suitable combination of hardware, software, and firmware.

Figure 6:
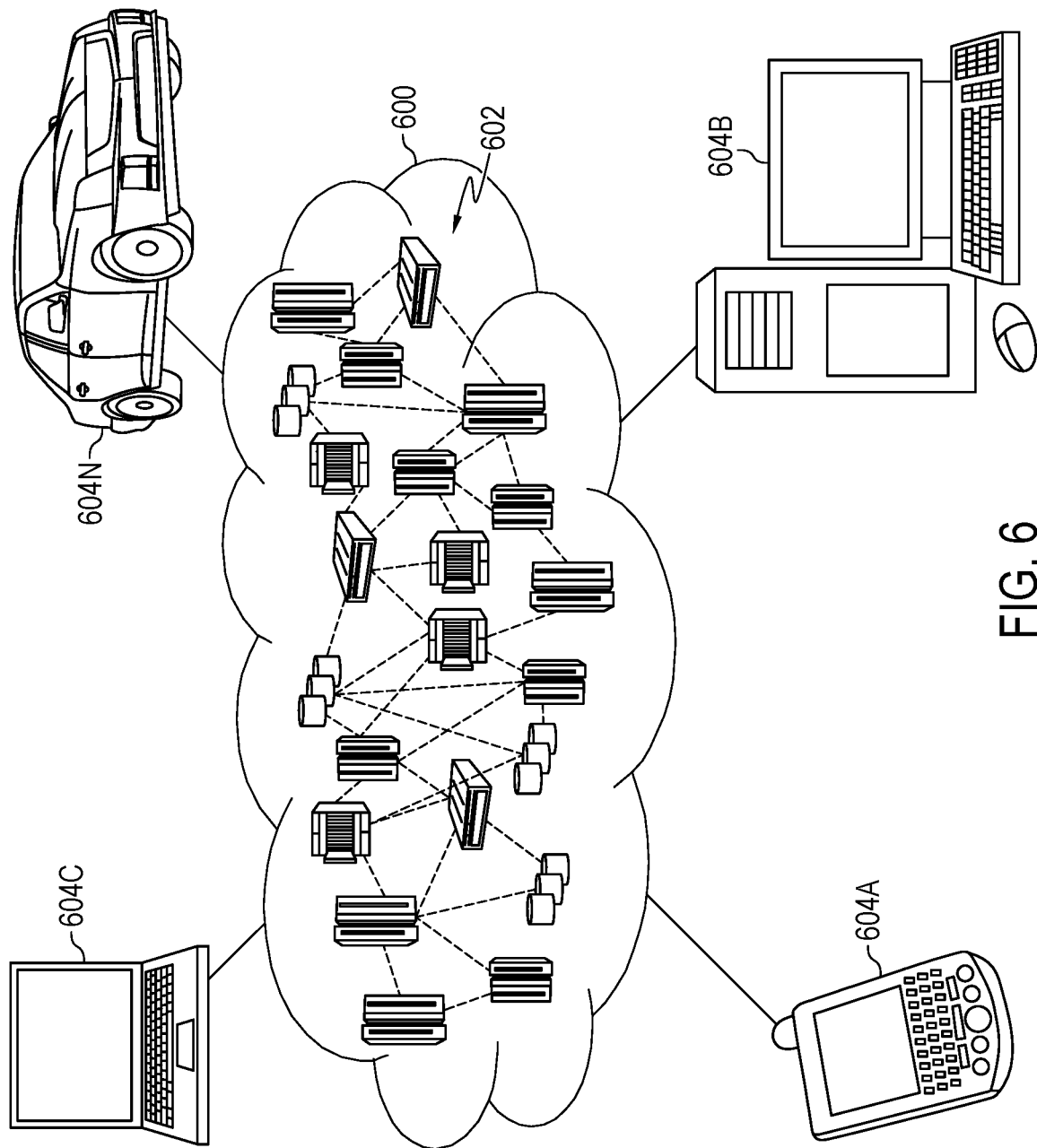
FIG. 6 is a diagram of an example cloud computing environment according to embodiments described herein.

Referring now to FIG. 6, illustrative cloud computing environment 600 is depicted. As shown, cloud computing environment 600 includes one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
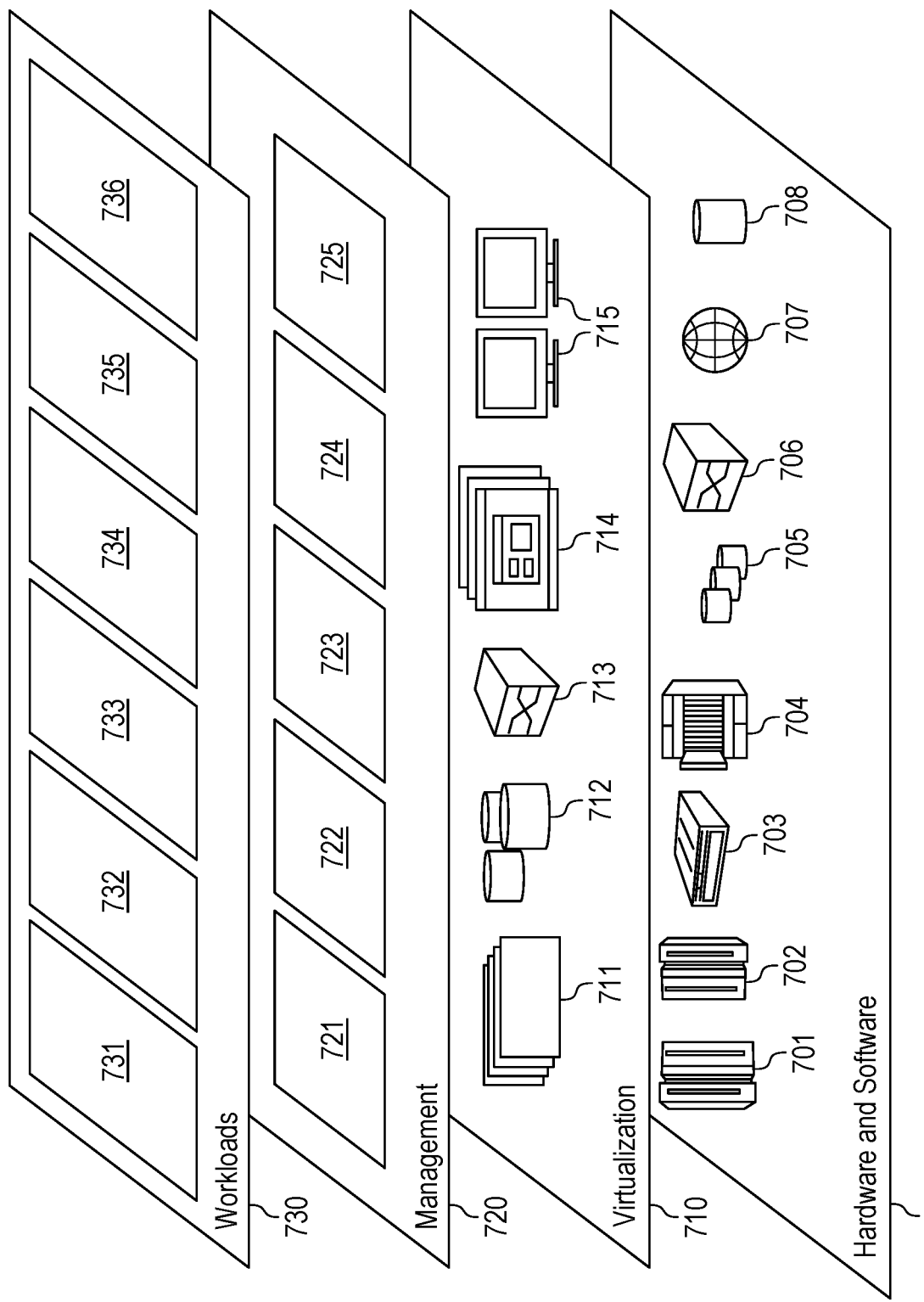
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 700 includes hardware and software components. Examples of hardware components include: mainframes 701; RISC (Reduced Instruction Set Computer) architecture based servers 702; servers 703; blade servers 704; storage devices 705; and networks and networking components 706. In some embodiments, software components include network application server software 707 and database software 708.

Virtualization layer 710 provides an abstraction layer from which the following examples of virtual entities may be provided: virtual servers 711; virtual storage 712; virtual networks 713, including virtual private networks; virtual applications and operating systems 714; and virtual clients 715.

In one example, management layer 720 may provide the functions described below. Resource provisioning 721 provides dynamic procurement of computing resources and other resources that are utilized to perform tasks within the cloud computing environment. Metering and Pricing 722 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 723 provides access to the cloud computing environment for consumers and system administrators. Service level management 724 provides cloud computing resource allocation and management such that required service levels are met. Service Level Agreement (SLA) planning and fulfillment 725 provide pre-arrangement for, and procurement of, cloud computing resources for which a future requirement is anticipated in accordance with an SLA.

Workloads layer 730 provides examples of functionality for which the cloud computing environment may be utilized. Examples of workloads and functions which may be provided from this layer include: mapping and navigation 731; software development and lifecycle management 732; virtual classroom education delivery 733; data analytics processing 734; transaction processing 735; and visual language grounding 736.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
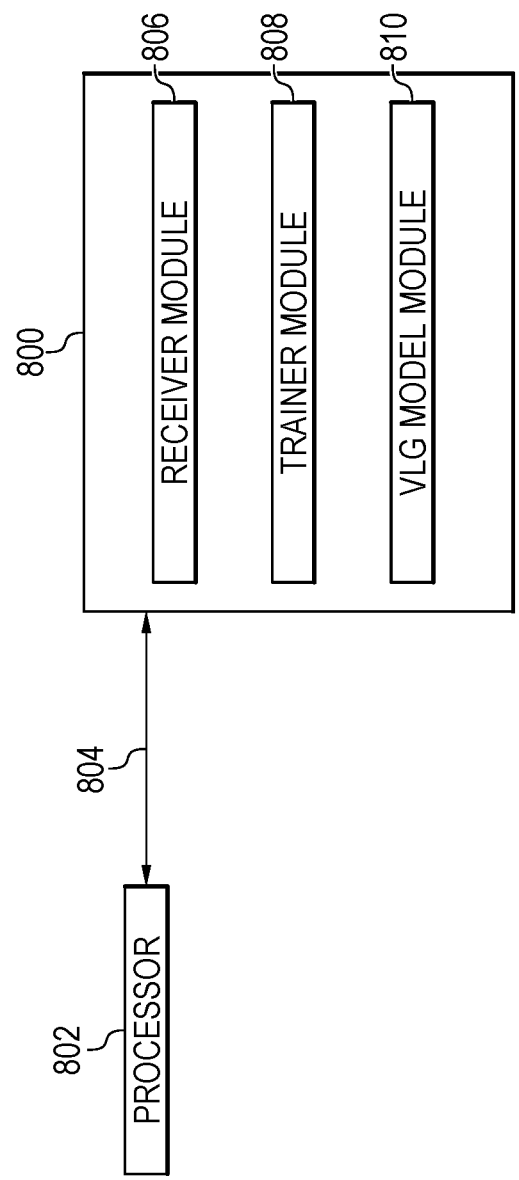
FIG. 8 is an example tangible, non-transitory computer-readable medium that can train a visual language grounding model to ground text in images using image separation.

Referring now to FIG. 8, a block diagram is depicted of an example tangible, non-transitory computer-readable medium 800 that can train a visual language grounding model to ground text in images using image separation. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 300 and 400 of FIGS. 3 and 4.

The various software components discussed herein may be stored on the tangible, non-transitory, computer-readable medium 800, as indicated in FIG. 8. For example, a receiver module 806 includes code to receive training images, corresponding training texts, and a randomly generated alpha-map. For example, the receiver module 806 may receive training images, corresponding training texts, and a randomly generated alpha-map at a training stage. The receiver module 806 also includes code to receive images and a query phrases. For example, the receiver module 806 includes code to receive images and a query phrases at an inference stage. In some examples, the module 806 includes code to. A trainer module 808 includes code to combine a pair of the training images using the randomly generated alpha-map to generate a blended image. The trainer module 808 further includes code to train a model to separate the training images in the blended image as conditioned on the corresponding training texts. The trainer module 808 also includes code to calculate a separation loss for each of the pair of training images as a main training objective. In some examples, the trainer module 808 further includes code to calculate an image-to-text loss for text and image feature distribution alignment. In some examples, the trainer module 808 further includes code to calculate a negative texts loss based on a third received training text that is unrelated to the pair of training images. In some examples, the trainer module 808 further includes code to calculate an unconditioned adversary loss to decrease overfitting on artifacts. A visual language grounding (VLG) model module 810 includes code to receive an image and a query phrase. The VLG model module 810 also includes code to generate an output heat-map associated with the image for the query phrase.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive a randomly generated alpha-map, a pair of training images, and a pair of training texts associated with the pair of training images;
generate a blended image based on the randomly generated alpha-map and the pair of training images; and
train a visual language grounding model to separate the blended image into a pair of heatmaps identifying portions of the blended image corresponding to each of the training images using a separation loss.

2. The system of claim 1, wherein the training texts comprise natural free-form texts.

3. The system of claim 1, wherein the visual language grounding model comprises an encoder to generate image encodings based on the alpha-map and the pair of training images, a text conditioner to generate a plurality of text attenuated image encodings based on the image encodings and the pair of training texts, and a decoder to convert the text attenuated image encodings into heatmaps.

4. The system of claim 3, wherein the text conditioner comprises a Bidirectional Encoder Representations from Transformers (BERT) model.

5. The system of claim 4, wherein the text conditioner comprises a plurality of projection modules coupled to the BERT model.

6. The system of claim 1, wherein the visual language grounding model is trained using an unconditioned adversary loss.

7. The system of claim 1, comprising a separately trained detector-based weak supervised grounding network, wherein the separately trained detector-based WSG network is to generate bounding boxes scores based on a received image and the trained visual language grounding model is to generate a first heatmap based on the received image, wherein the bounding box scores are converted to a second heatmap using assignment of the bounding box scores to pixels of the bounding box, and wherein the first heatmap and the second heatmap are averaged to generate a combined heatmap.

8. A computer-implemented method, comprising:
receiving, via a processor, training images, corresponding training texts, and a randomly generated alpha-map;
combining, via the processor, a pair of the training images using the randomly generated alpha-map to generate a blended image; and
training, via the processor, a visual language grounding model to separate the training images in the blended image as conditioned on the corresponding training texts.

9. The computer-implemented method of claim 8, comprising:
receiving, via the processor, an image and a query phrase;
inputting, via the processor, the image and the query phrase into the trained visual language grounding model; and
receiving, via the processor, an output heatmap for the query phrase from the trained visual language grounding model.

10. The computer-implemented method of claim 8, wherein training the visual language grounding model comprises calculating a separation loss for each of the pair of training images as a main training objective.

11. The computer-implemented method of claim 10, wherein training the visual language grounding model comprises calculating an image-to-text loss for text and image feature distribution alignment.

12. The computer-implemented method of claim 8, wherein training the visual language grounding model comprises calculating a negative texts loss based on a third received training text that is unrelated to the pair of training images.

13. The computer-implemented method of claim 8, wherein training the visual language grounding model comprises calculating an unconditioned adversary loss to decrease overfitting on artifacts.

14. The computer-implemented method of claim 8, further comprising:
receiving an image and a query phrase;
inputting the image and the query phrase into the trained visual language grounding model and a separately trained detector-based model;
receiving a first heatmap associated with the image for the query phrase from the trained visual language grounding model;
receiving a bounding box with a bounding box score for the query from the separately trained detector-based model;
converting the bounding box score into assigned values for pixels in the bounding box to generate a second heatmap for the image; and
combining the first heatmap and the second heatmap to generate a combined heatmap for the query and the image.

15. A computer program product for training visual language grounding models, the computer program product comprising a computer-readable storage medium having program code embodied therewith, wherein the computer-readable storage medium is not a signal per se, the program code executable by a processor to cause the processor to:
receive training images, corresponding training texts, and a randomly generated alpha-map;
combine a pair of the training images using the randomly generated alpha-map to generate a blended image; and
train a visual language grounding model to separate the training images in the blended image as conditioned on the corresponding training texts.

16. The computer program product of claim 15, further comprising program code executable by the processor to;
   receive an image and a query phrase;
   input the image and the query phrase into the trained visual language grounding model; and
   receive an output heatmap for the query phrase from the trained visual language grounding model.

17. The computer program product of claim 15, further comprising program code executable by the processor to calculate a separation loss for each of the pair of training images as a main training objective.

18. The computer program product of claim 15, further comprising program code executable by the processor to calculate an image-to-text loss for text and image feature distribution alignment.

19. The computer program product of claim 15, further comprising program code executable by the processor to calculate a negative texts loss based on a third received training text that is unrelated to the pair of training images.

20. The computer program product of claim 15, further comprising program code executable by the processor to calculate an unconditioned adversary loss to decrease overfitting on artifacts.

* * * * *